US009047913B2

(12) United States Patent
Gehani (10) Patent No.: US 9,047,913 B2
(45) Date of Patent: Jun. 2, 2015

(54) MEDIA BUNDLE OVERLAYS (75) Inventor: Samir Gehani, Cupertino, CA (US)

(73) Assignee: Apple, Inc., Cupertino, CA (US)

( * ) Notice: Subject to any disclaimer, the term of this patent is extended or adjusted under 35 U.S.C. 154(b) by 582 days.

(21) Appl. No.: 13/368,120

(22) Filed: Feb. 7, 2012

(65) Prior Publication Data

US 2013/0204908 A1 Aug. 8, 2013

(51) Int. Cl.
*G06F 17/30* (2006.01)
*G11B 27/00* (2006.01)
*H04N 21/236* (2011.01)
*H04N 21/432* (2011.01)
*H04N 21/6543* (2011.01)
*G11B 27/10* (2006.01)

(52) U.S. Cl.
CPC .......... *G11B 27/00* (2013.01); *H04N 21/23614* (2013.01); *H04N 21/4325* (2013.01); *H04N 21/6543* (2013.01); *G11B 27/105* (2013.01)

(58) Field of Classification Search
CPC ............ G06F 21/10; G06F 2221/0766; G06F 17/3056; G06F 8/30; G06F 8/34; G06F 17/30902; G06F 8/61; G06F 8/65; G06F 9/4443; G06F 9/44526
See application file for complete search history.

(56) References Cited

U.S. PATENT DOCUMENTS

| 2003/0233349 | A1* | 12/2003 | Stern et al. .................... 707/3 |
| 2006/0123052 | A1* | 6/2006 | Robbin et al. ............. 707/104.1 |
| 2011/0060741 | A1 | 3/2011 | Heller et al. |
| 2011/0060742 | A1 | 3/2011 | Heller et al. |
| 2011/0060991 | A1 | 3/2011 | Grant et al. |
| 2011/0099609 | A1* | 4/2011 | Malhotra et al. .................. 726/4 |

OTHER PUBLICATIONS

"Finding and adding subtitles through Media Player Classic," webpage print-out from www.afterdawn.com, dated Nov. 18, 2011, 3 pages.

* cited by examiner

*Primary Examiner* — Dinku Gebresenbet
(74) *Attorney, Agent, or Firm* — Kenyon & Kenyon LLP (57) ABSTRACT

A media bundle and one or more media bundle overlays allow modifying content that is to be played by a playback framework of an electronic device with multimedia content objects contained in the media bundle overlays without modifying the media bundle. A runtime data structure dynamically incorporates the multimedia content contained in the media bundle with multimedia content contained in the media bundle overlays. Manifest objects in the media bundle and some media bundle overlays describe multimedia content contained in the media bundle and the corresponding media bundle overlays. Multimedia content contained in the multimedia bundle overlays may supplement or replace multimedia content contained in the media bundle.

25 Claims, 5 Drawing Sheets

MEDIA BUNDLE OVERLAYS

BACKGROUND

This disclosure relates generally to the field of multimedia data. More particularly, but not by way of limitation, it relates to a technique for modifying media files to incorporate additional or replacement content without modification of the original media file.

Figure 1:
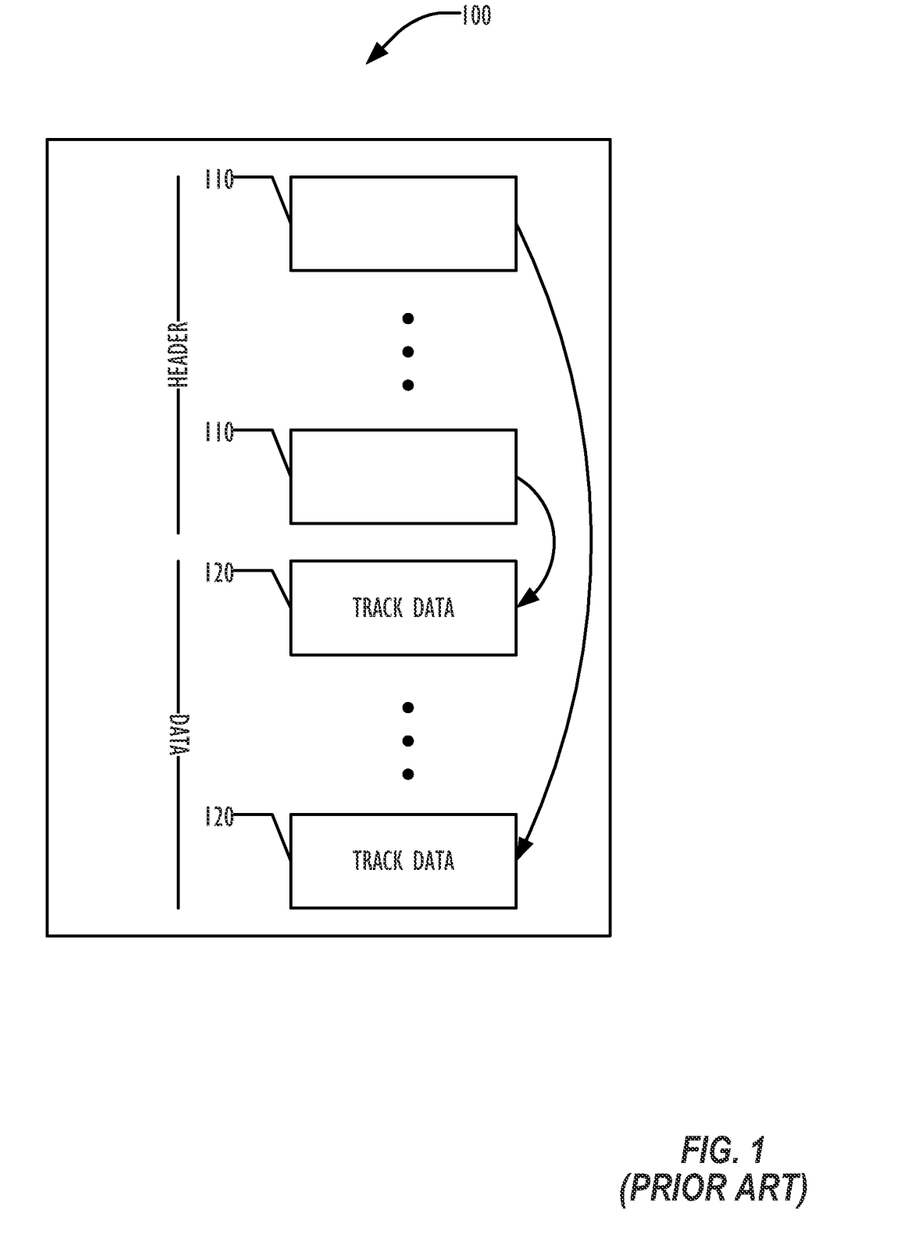
FIG. 1 is a block diagram illustrating a media file according to the prior art.

Media content is currently distributed as a file composed of a header portion and a data portion. FIG. 1 illustrates a typical media file 100. Tables 110 within the header portion identify (point to) content 120 (e.g., tracks). The media file, as originally created and then downloaded by a user, has typically been gone through a quality control process that has certified the content in the media file. Incorporating new content therefore incurs the cost of re-qualifying the modified media file, which requires the recoding and/or re-downloading of the entire media file with the new data incorporated therein. Typically requalification of a media file grows exponentially with each element added to the media file, because each combination of modules that could be selected for playing the media file should be qualified.

In addition, this format may not provide the ability to easily incorporate new content once the file has been created and/or downloaded (e.g., a secondary subtitle or audio track). In some implementations, the media file structure may allow for incorporating additional content, but the media file 100 may not be writable when the additional content is to be incorporated. In other implementations, the media file structure may not allow content files to be dynamically grown, thus the desired new information may not just be inserted into the media file.

Because the monolithic media file contains all of the original content and all additional content, the time required to download the content by a user and the amount of storage needed to store the downloaded media file increases as new content is added, even if a particular user has no interest in all of the additional content. For example, an original media file may have content only in English, but as subtitles or dubbing tracks are added to translate the original media into other languages, a person desiring only the English version or just one other language additional content must download the entire monolithic file with every available language.

SUMMARY

A media bundle and one or more media bundle overlays allow modifying content that is to be played by a playback framework on an electronic device with multimedia content objects contained in the media bundle overlays without modifying the media bundle. A runtime data structure dynamically incorporates the multimedia content contained in the media bundle with multimedia content contained in the media bundle overlays. Manifest objects in the media bundle and some media bundle overlays describe multimedia content contained in the media bundle and the corresponding media bundle overlays. Multimedia content contained in the media bundle overlays may supplement or replace multimedia content contained in the media bundle.

In one embodiment, a method is disclosed. The method includes accessing a first manifest object incorporated in a media bundle file stored on a computer system, the first manifest object comprising information describing a first multimedia content object contained in the media bundle; generating a runtime structure for the first multimedia content object on the computer system based, at least in part, on information describing the first multimedia content object in the first manifest object; accessing a second manifest object incorporated in a media bundle overlay file stored on the computer system, the second manifest object comprising information describing a second multimedia content object contained in the media bundle overlay file; incorporating the second multimedia content object described in the second manifest object into the runtime structure; and playing, on the computer system, a combination of the first and second multimedia content objects in accordance with the runtime structure.

In another embodiment, a non-transitory program storage device is disclosed. The non-transitory program storage device is readable by a programmable control device, and includes instructions stored thereon for causing the programmable control device to access a media bundle file stored on the programmable control device; generate a runtime structure for the programmable control device responsive to a first manifest object contained in the media bundle file, the first manifest object describing a first multimedia content object contained in the media bundle file; access a first media bundle overlay file stored on the programmable control device; update the runtime structure for the programmable control device responsive to information contained in the first media bundle overlay file, comprising instructions for causing the programmable control device to: incorporate a second multimedia content object contained in the first media bundle overlay file into the runtime structure; and play, on the programmable control device, a combination of the first multimedia content object and the second multimedia content object.

In yet another embodiment, a non-transitory storage device is disclosed. The non-transitory storage device is readable by a programmable control device, and includes files stored thereon for use by the programmable control device, the files including a media bundle overlay file that contains a manifest object and a multimedia content object, where the media bundle overlay file corresponds to a media bundle accessible by the programmable control device, the media bundle including a media bundle manifest object that describes a media bundle multimedia content object, and wherein the manifest object comprises information describing the multimedia content object for incorporating the multimedia content object into a runtime structure created by the programmable control device from the media bundle.

In yet another embodiment, an apparatus is disclosed. The apparatus includes a programmable control device; a storage device, coupled to the programmable control device, wherein are stored a media bundle file; and a first media bundle overlay file; and a memory coupled to the programmable control device, wherein instructions are stored in the memory, the instructions causing the programmable control device to access a first manifest object incorporated in the media bundle, the first manifest object including information describing a first multimedia content object contained in the media bundle; generate a runtime structure for the first multimedia content object on the programmable control device based, at least in part, on information describing the first multimedia content object in the first manifest object; access a second manifest object incorporated in the first media bundle overlay file, the second manifest object including information describing a second multimedia content object contained in the first media bundle overlay file; incorporate the second multimedia content object described in the second manifest object into the runtime structure; and play, on the programmable device, a combination of the first and second multimedia content objects in accordance with the runtime structure.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

In the interest of clarity, not all features of an actual implementation are described in this specification. It will of course be appreciated that in the development of any such actual implementation (as in any development project), numerous decisions must be made to achieve the developers' specific goals (e.g., compliance with system and business-related constraints), and that these goals will vary from one implementation to another. It will be further appreciated that such development effort might be complex and time-consuming, but would nevertheless be a routine undertaking for those of ordinary skill having the benefit of this disclosure.

In the following discussion, a file is defined as a named object in a file system used for organizing files on a storage device. A file may have an internal structure that may incorporate one or more other named objects that allows for access to individual objects incorporated in the file. For example, in a file system in which objects are organized into folders (sometimes referred to as directories), a file may be a folder object that organizes multiple other files, including subfolders (subdirectories). In another example, a file may be a file created using one of numerous techniques for compressing and archiving original file system objects, such as what is commonly known as a zip file. Files may be stored in the file system in any way provided for by the file system. Some file systems allow for separately stored pieces of a file to be associated with a single name, sometimes referred to as streams or forks. In such a file system, the file includes all of the separately stored pieces that are associated with the name of the file.

A media file is defined as either a media bundle or a media bundle overlay. A media bundle is file that may include one or more multimedia content objects and zero or more manifest objects that describe the structure of the media bundle. When the media bundle file is implemented as a folder in a file system, each of the multimedia content objects and manifest objects in the media bundle may be a separate file system object in that folder.

A media bundle overlay is file that may include one or more content objects that is intended to supplement or replace content contained in a media bundle. A media bundle overlay may (but need not) also contain one or more manifests to describe the content contained in the media bundle overlay. As with media bundles, if the media bundle overlay is implemented as a folder in a file system, the multimedia content and manifests contained in the media bundle overlay may be separate file system objects in that folder.

Media files may contain any number (including zero) manifests and one or more multimedia content objects.

An extended media bundle is a media bundle and its corresponding media bundle overlays, which may be processed at runtime as if the media bundle overlays had been incorporated into the media bundle, even though they may be stored as separate files in the file system.

A media file may include the content itself, or may provide a pointer (typically a uniform resource locator (URL)) to an external source of the content. A track is defined as a media content object of a uniform type that is contained in or pointed to by a media file. A track need not correspond directly to an album track, but may contain multiple album tracks. A media file may contain multiple tracks of different content types. In a typical simple case, one track represents an audio component, and another represents a video component; in a complex composition, however, there may be multiple overlapping tracks of audio and video, including subtitle tracks.

Although the present description is written in terms of files and file systems, the particular representation of the files and file systems described below is illustrative and by way of example only. The description below is not intended to limit the concept of files and file systems to any particular underlying file system structure or techniques for storage or accessing of data, and the term file may be understood as including any object in the file system that can be separately accessed, as well as any object in a file system file that can be separately addressed within the file system file.

In the following description, references to something being in memory may include that something in any form of storage medium, including random access memory, but also including other storage media, such as hard disk drives.

A media bundle provides a way to allow modification of a media bundle without having to re-qualify the existing content of the media bundle. The media bundle includes a directory structure that allows extension files to be added to the directory structure at runtime. Thus, the original media bundle file does not need to be modified to provide for extensions. The extensions at runtime may supplement or replace existing content in the media bundle, and re-qualification of the extended media bundle (the original bundle and its extensions, if any) can be done by qualifying just the extensions, without having to re-qualify the original bundle or the various combinations of extensions and original media bundle. This also allows a user to download just the original media bundle and only the extensions desired by the user, reducing download time and storage requirements for the user.

Figure 2:
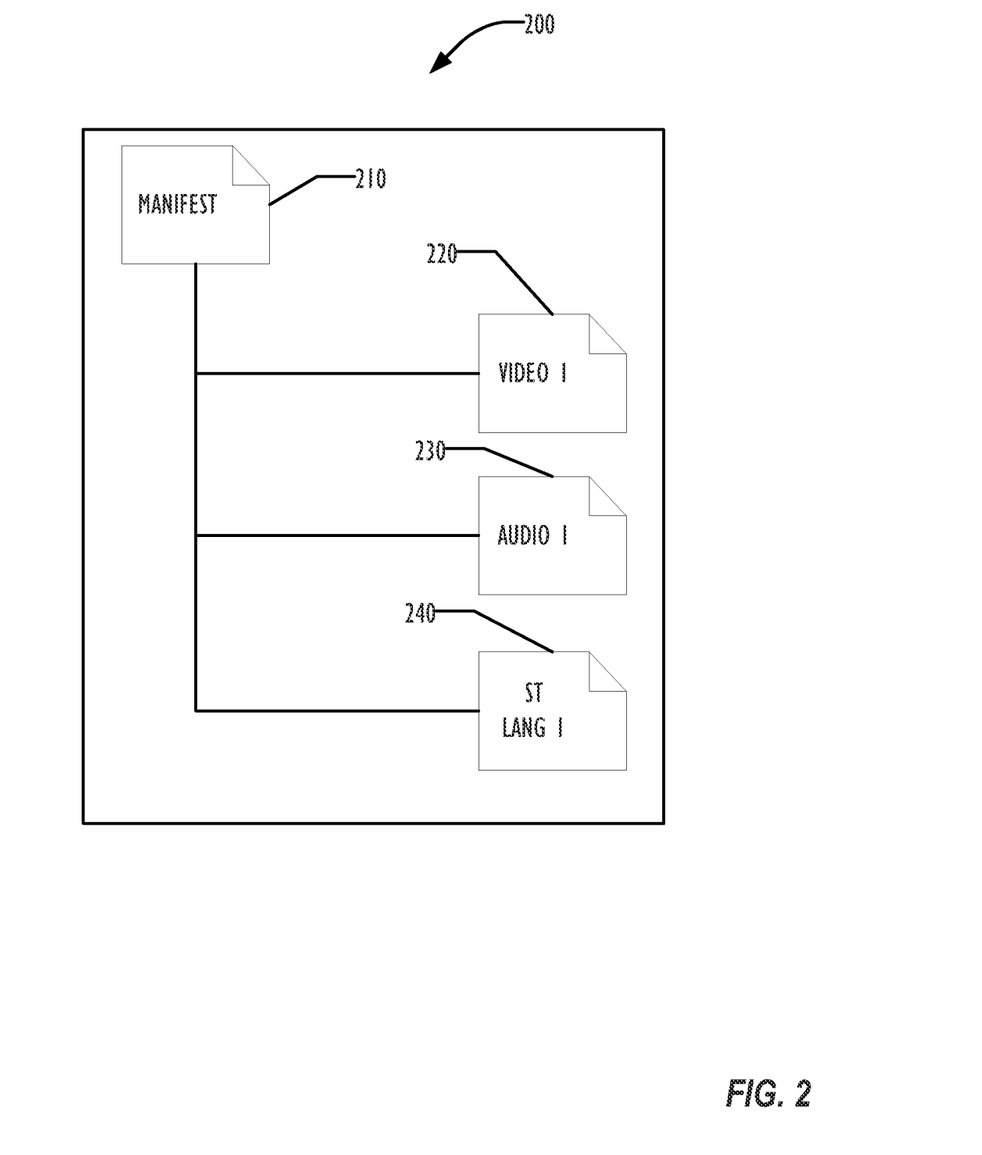
FIG. 2 is a block diagram illustrating a media bundle file according to one embodiment.
Figure 3:
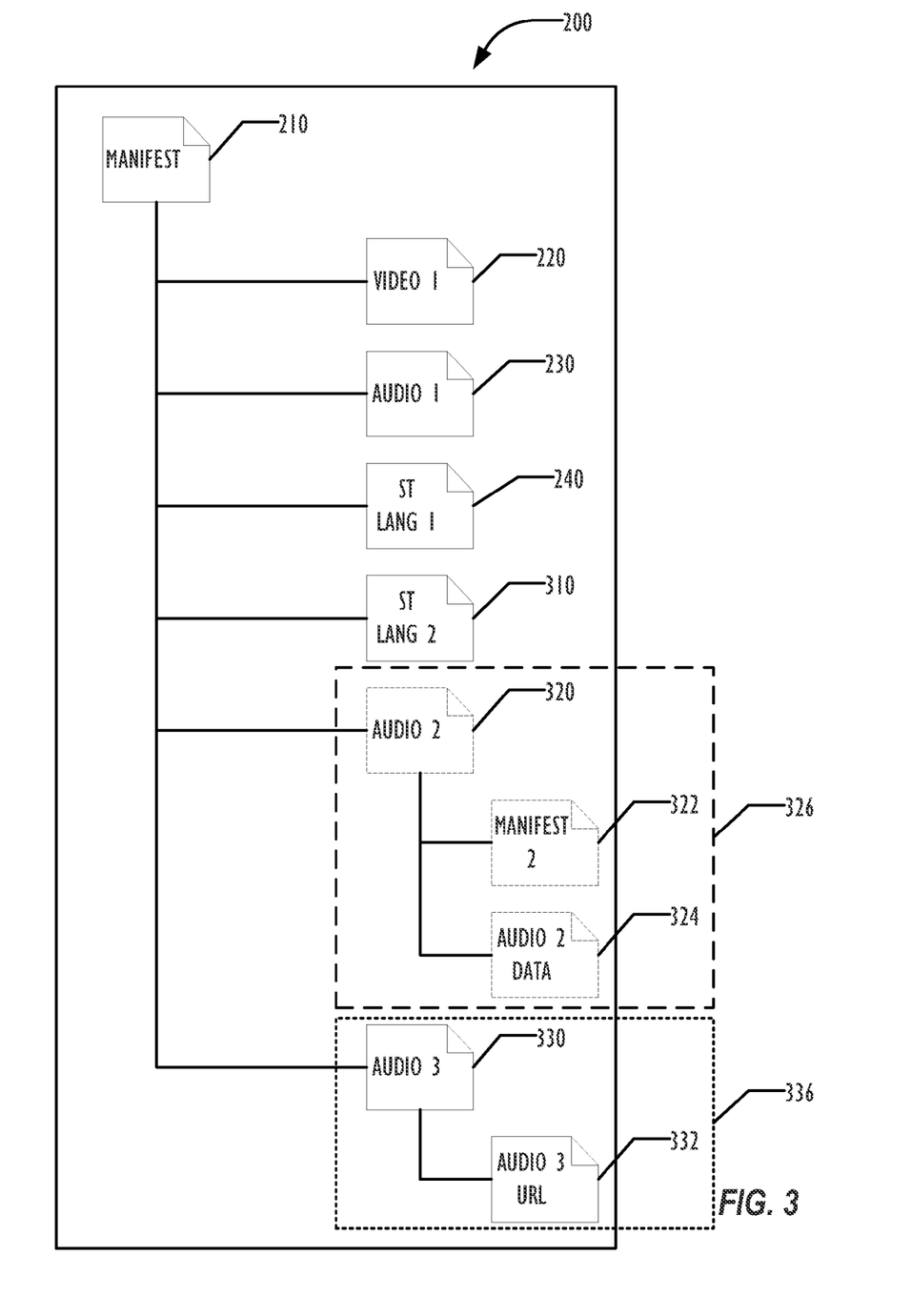
FIG. 3 is a block diagram illustrating integration at runtime of media bundle overlay files with a media bundle according to one embodiment.

In one embodiment, when a media bundle may contain a directory structure such as illustrated in the media bundle 200 of FIG. 2. A manifest object 210 identifies each component of the original media bundle 200. In this particular example, there is a first video file 220, a first audio file 230 and a first subtitle file 240. If, later, additional subtitles or audio are made available, the additional content may be delivered and identified as a media bundle overlay file. The media bundle overlay may be identified by a name extension, for example, mbx. In FIG. 3, a second subtitle file 310 and second and third audio files 320 and 330 have been hooked at runtime into the extended media bundle directory structure of the media bundle 200, but the original media bundle file 200 remains unchanged.

Although media bundles preferably contain a manifest object in addition to content objects, in one embodiment a media bundle may contain only a content object, without a manifest.

At runtime, the original media bundle's manifest may be inspected to determine what was originally downloaded. In addition, each media bundle overlay file may be inspected and dynamically incorporated into the in-memory copy of the existing file structure as illustrated in FIG. 3. In this example, two media bundle overlays 326 and 336 have been incorporated.

In first media bundle overlay 326, a second audio track 320 has been provided so that a second language could be listened to (e.g., a dubbed audio version). As shown, Audio 320 may be implemented using a file structure similar to the original media bundle, with its own manifest 322 and audio file 324. Such a file structure in the media bundle overlay may be particularly useful for various reasons, including replacing original content or providing additional content that may be downloaded before it is played.

In the second media bundle overlay 336, a third audio content 330 may be used to provide streaming and simultaneous use actions. That is, audio content 330 may contain an Audio URL 332 that may be used to obtain data to stream the new audio (e.g., to replace Audio 230) while the Audio 330 data is being downloaded. In one embodiment, both the downloading and use of the content may occur at the same time. When the new content has completed downloading, the streaming operation may be halted and the downloaded audio data of Audio 330 could be used. Although in this example additional audio content is described, the same techniques allow for providing other types of content, such as video, subtitle, or other content.

One benefit to this approach to packaging and distributing multimedia content is that it is extensible without having to encode new content into the original content, thus where content is qualified before distribution, only the new content may be separately qualified, instead of the entire combined package. A second benefit to this approach is that it permits the simultaneous download and use of new content. A third benefit of this approach is that it permits new content (some of which may come from unknown sources) to be placed into a sandbox during decoding or playback operations so that the untrusted content that may be malware cannot cause security problems. A fourth benefit of this approach is that executable code may be safely included in the media bundle overlay for execution in the sandbox.

Playback Framework

A playback framework in an electronic device is used for playing media bundles and media bundle overlays. When playing an extended media bundle, the original media bundle file and all relevant extension files that together form the extended media bundle are located and processed by the playback framework.

In some embodiments, a media bundle overlay file may further include objects that may be used by the playback framework to provide extended capabilities for the playback framework, such as code or other information to allow the playback framework to process an indicated language. The manifest object in such a media bundle overlay would indicate the nature of the extension objects in such a way to allow the playback framework to recognize and use them. For example, the playback framework may be originally distributed without the fonts necessary to display That characters for use in subtitles, and a language pack media bundle overlay may provide those fonts and other language-related capabilities to the playback framework, including code modules for execution by the playback framework. When the playback framework integrates the media bundle overlays into the media bundle at runtime, those extension capabilities may be added to the playback framework, based on the manifest object in the media bundle overlay. Thus, the media bundle overlay allows extending both the media bundle content and the playback framework that processes that content.

In one embodiment, the relevant media bundle overlay files may be all files in a subdirectory of the directory containing the media bundle. In another embodiment, the extension files may be files in the same directory as the media bundle that have a particular characteristic, for example, sharing a common name with the media bundle, and a predetermined filename extension. For example, in such an embodiment, a media bundle may be a file named XYZ.mb, and relevant extension files may be named XYZ.mbx. Any desired naming convention may be used to associate media bundles and extension files. Other embodiments may use other properties to associate the media bundles with media bundle overlay files. In one embodiment, other file system properties may be used to designate a file as a media bundle file or a media bundle overlay file. In some embodiments, a given directory in a file system may contain multiple media bundles, and media bundle overlays for all of the media bundles may be contained in the same directory.

When processing the extended media bundle, the playback framework may then build a runtime structure using manifest objects in the extended media bundle. The playback framework may use the metadata found in the manifest to assemble the content in a form needed to play the media file. For example, the playback framework may assemble and synchronize an audio track with a video track, or a subtitle track with an audio track and a video track. Where the track represents a pointer to media content, the playback format may cause whatever action is required to obtain the media content from the external source, in addition to playing the media content once obtained, either by streaming or downloading.

Manifest Objects

A manifest object is an object contained in a media file that describes the contents of the media file. Media bundle overlays may be provided without manifest objects (such as media bundle overlay 336 of FIG. 3) or with their own manifest objects (such as media bundle overlay 326).

Manifest objects typically provide an indication of the type of track that may be contained in the media file. Other metadata (information about the track) may be included in the manifest as desired. For example, a video track may be described by metadata identifying the format (e.g., HD or SD) of the video. The manifest object may also include other metadata as desired, for example bibliographic information (title, etc.), the size of the content, and pointers within the media file to the start and/or end of the track. Where the track represents a pointer to an external source of the content, the track may contain a URL or any other suitable type of indication to the playback framework to allow it to locate and obtain the actual content pointed to by the track in the media file, while the manifest indicates that the track is a pointer track, rather than containing the actual content. Where the track represents a pointer to media content, the manifest may indicate whether the media content is to be streamed from the external source, must be downloaded prior to playing it, or may be progressively downloaded, allowing playing the media content after downloading enough to begin playing it and continuing to download while playing the content.

In one embodiment, the manifest object is implemented as a hierarchically structured object, which may use any convenient technique for defining the hierarchical structure. In one embodiment, the hierarchical structure is implemented using eXtended Markup Language (XML) constructs. For example, a manifest object according to one embodiment may include XML constructs such as "<movie><track-1>type=video_type" to describe a video track of a movie.

In one embodiment, the manifest object may indicate that a content object in a media bundle overlay is to replace a content object in the media bundle; alternatively, the content object may be marked as supplementing content in the media bundle.

At runtime, the playback framework reads the manifest object from the media bundle and generates a hierarchical structure in memory corresponding to the relationships embodied in the media bundle. The playback framework then locates the relevant media bundle overlays and dynamically updates the hierarchical structure with the information obtained from the media bundle overlays. This updated hierarchical structure can then be used for playback of the media as desired.

Because the hierarchical structure is built dynamically in memory, without modifying the media bundle or the media bundle overlays, the media bundle may be extended with the media bundle overlays without having to re-qualify or re-certify the media bundle. In addition, a user may obtain some media bundle overlays without obtaining others, the download time may be reduced, and the storage requirements on the user's electronic device may be reduced.

For example, consider a media bundle that is initially produced with a video content track and an audio content track, where the audio content is in English. After the initial distribution of the media file, the content producer may have the video dubbed into multiple other languages, such as Spanish, French, German, That, and Chinese. A user wishing to obtain the That dubbed audio would be able to download the media bundle overlay containing just the That audio track, without having to obtain the audio tracks for the other languages, while another user wishing to obtain multiple different language audio tracks would be able to download the desired multiple language, without having to download all of them. In one embodiment, the That audio content track may be marked as replacing the English audio track of the media bundle. In one embodiment, where the electronic device contains the ability to select between a primary audio program and a secondary audio program, the playback framework may generate a primary audio program stream from an audio content object in the media bundle and a secondary audio program stream from an audio content object in a media bundle overlay file.

Subtitle tracks may be added and synched to the original audio track in the media bundle, without flattening or rewriting the media bundle file. Incorporation of the subtitle track may be performed by the playback framework at runtime, rather than at distribution time.

In one embodiment, a media bundle overlay file may include information for streaming media content, providing instant access to a new content, instead of waiting for the content to be downloaded. The playback framework may recognize the streaming content in the media bundle overlay and cause the content to be streamed dynamically.

In a further embodiment, a media bundle overlay may provide both streaming and downloading simultaneously. The media bundle overlay may be a pointer to an external source of the content with an indication that the content is to be streamed, downloaded, or both. Where the indication is that the content is to be both streamed and downloaded, the playback framework may dynamically begin streaming (and playing) the content, while simultaneously downloading it. If the download completes while streaming is being performed, the playback framework may switch to playing from the downloaded content, terminating the streaming, transparently to the user.

Where a media bundle overlay contains a pointer to an external source, the externally obtained content may be structured with a manifest and content tracks, and the playback framework may integrate the hierarchical structure of the externally obtained content into the hierarchical structure of the extended media bundle dynamically, just as if the additional structure was contained in a media bundle overlay file stored locally.

In one embodiment, there is no limit on the number of hierarchical levels of content that may be defined in media files.

In one embodiment, a playback framework may be configured by a user interface to incorporate only some of a media file into the runtime data structure. For example, a user may configure the playback framework to only play That audio tracks, even if audio tracks in other languages are available. If the media bundle includes an English audio track, and a media bundle overlay includes a That audio track and a Hindi audio track, the playback framework may choose to ignore the English and Hindi audio tracks, loading only the That audio track into the runtime data structure for playback purposes. Similarly, the playback framework when building the runtime data structure for an extended media bundle containing subtitle tracks in addition to audio and video tracks may choose to ignore the subtitle tracks if the user has configured the user interface to specify subtitles are not desired.

Security

In some cases, media tracks from an unknown or remote source may contain malware, such as specially constructed media content to take advantage of known weaknesses in the playback framework. In one embodiment, the playback framework may decode the media bundle overlay in a sandbox, to attempt to prevent malware effects. This may include processing the streaming of the media bundle overlay's content in the sandbox. By allowing the playback framework to sandbox the media bundle overlay, the pre-certified media bundle (or media bundle overlays from a trusted source) may avoid the sandbox overhead, only employing sandbox techniques when the source is untrusted.

In one embodiment, the dynamically built and updated hierarchical structure for the combined media bundle and its extensions may be pushed into a cache memory. This allows cache control to flush the cache securely and easily when desired.

Figure 4:
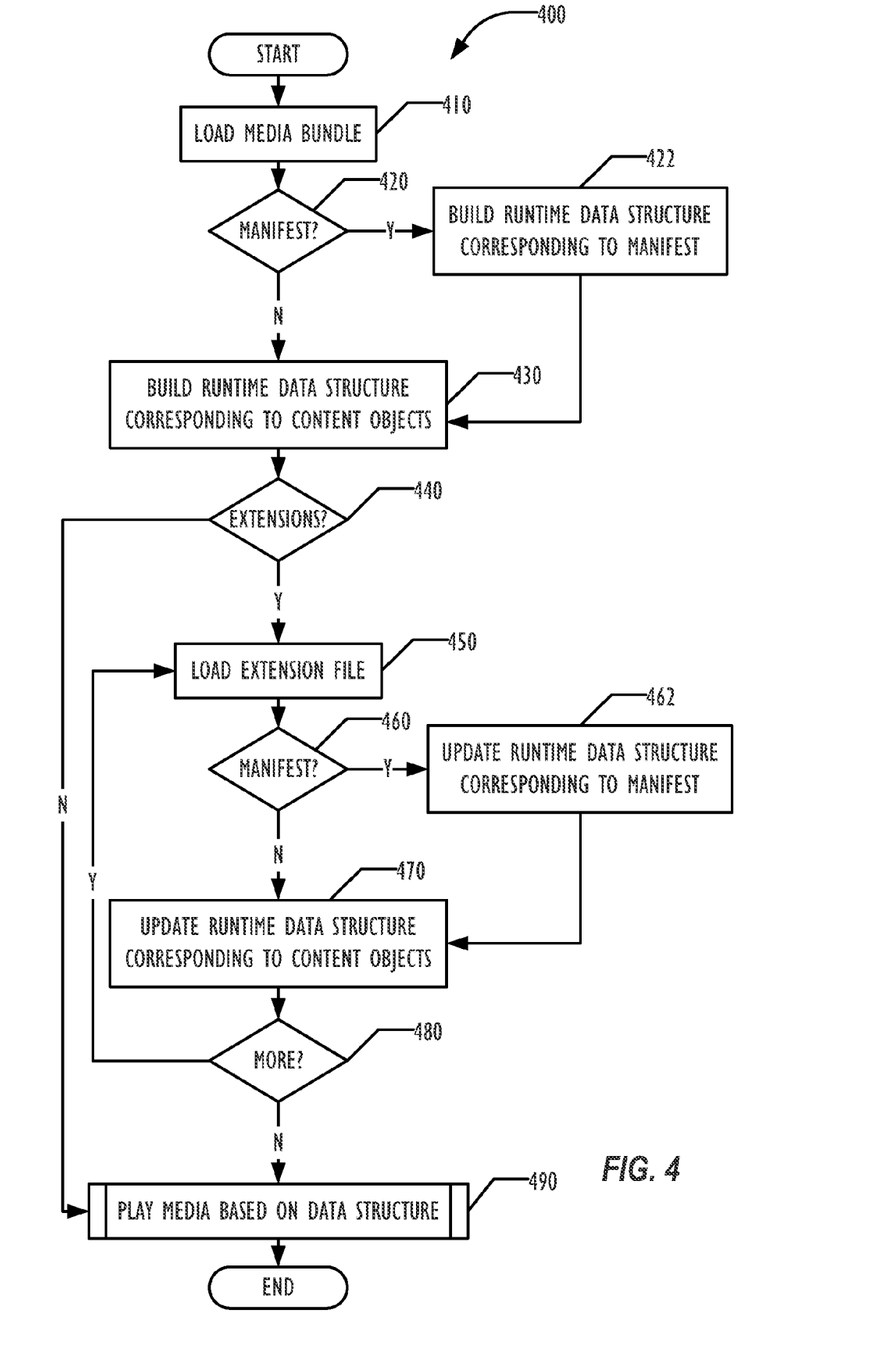
FIG. 4 is a flowchart illustrating a technique for integrating media bundle overlay files with a media bundle file at runtime according to one embodiment.

FIG. 4 is a flowchart illustrating a technique 400 for the playback framework to process a media file at runtime according to one embodiment. In block 410, the playback framework loads the media bundle file into memory responsive to a request by a user to play the media bundle. In block 420, the playback framework determines whether the media bundle internal structure includes a manifest object. If a manifest object exists, then in block 422, the playback framework parses the contents of the manifest and begins building the runtime data structure for the media bundle based on the manifest. The manifest also is used to locate the various content objects contained in the media bundle.

In block 430, the playback framework builds the runtime data structure based on the content objects found in the media bundle. At this point, the playback framework has sufficient information to begin playing the media bundle.

In block 430, however, the playback framework searches for any relevant media bundle overlay files. If no relevant media bundle overlays are present, then in block 490 the playback framework may begin playing the content contained in the media bundle for a user.

If any relevant media bundle overlays are located, then in block 450 the media bundle overlay is loaded into memory and analyzed. In block 460, the media bundle overlay is checked for a manifest object. If a manifest object is present, then in block 442 the playback framework dynamically updates the existing runtime data structure created from the media bundle, to begin incorporating the extension's media content, parsing the manifest object information to determine what content objects are contained in the media bundle overlay. In a media bundle overlay without a manifest object, the extension may contain a single self-identified content object.

Once the manifest object has been parsed, or if no manifest exists in the media bundle overlay, then in block 470 the playback framework may dynamically update the runtime data structure corresponding to the extended media bundle as needed, based on the content and manifest.

In block 480, after processing the first media bundle overlay, the playback framework determines whether any additional media bundle overlay files are present. In one embodiment, there is no limit on the number of media bundle overlay files that may be processed for a given media bundle. Other embodiments may limit the number of media bundle overlays that may be applied to the media bundle.

Implementation in an Electronic Device

Figure 5:
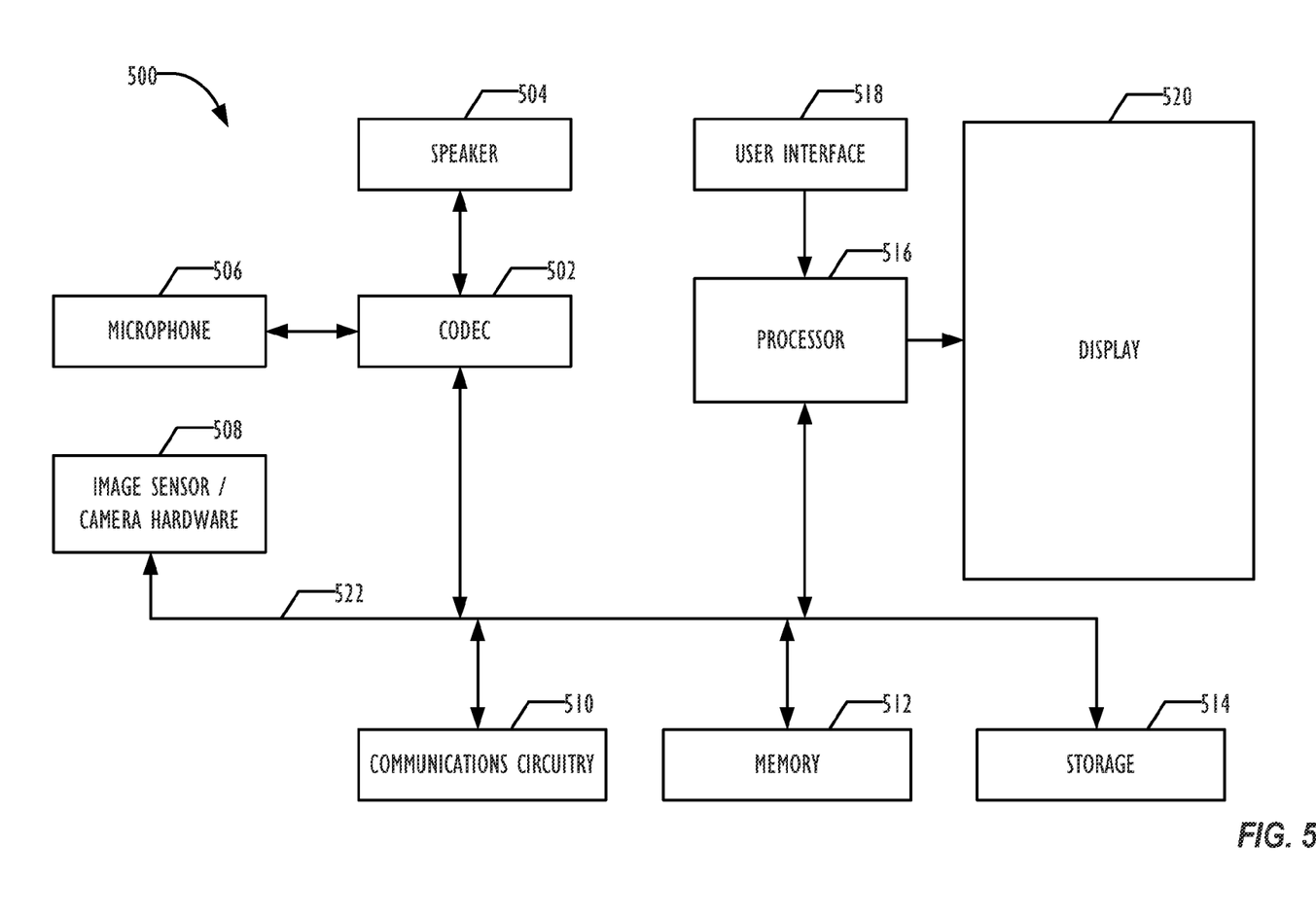
FIG. 5 is a block diagram illustrating an electronic device in which the techniques described herein can be implemented according to one embodiment.

FIG. 5 is a simplified functional block diagram illustrating an electronic device FIG. 500 according to one embodiment that can implement the techniques described above. The electronic device FIG. 500 may include a processor FIG. 516, display FIG. 520, microphone FIG. 506, audio/video codecs FIG. 502, speaker FIG. 504, communications circuitry FIG. 510, an image sensor with associated camera hardware FIG. 508 for performing image capture, user interface FIG. 518, memory FIG. 512, storage device FIG. 514, and communications bus FIG. 522. Processor FIG. 516 may be any suitable programmable control device and may control the operation of many functions, such as the generation and/or processing of image data, as well as other functions performed by electronic device FIG. 500. Processor FIG. 516 may drive display FIG. 520 and may receive user inputs from the user interface FIG. 518. An embedded processor provides a versatile and robust programmable control device that may be utilized for carrying out the disclosed techniques. The processor 516 may include (typically as a separate circuitry) a graphics processing unit (GPU) with hardware encode/decode capabilities useful for media processing.

Storage device FIG. 514 may store media (e.g., image and video files), software (e.g., for implementing various functions on device FIG. 500), preference information, device profile information, and any other suitable data. Storage device FIG. 514 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory FIG. 512 may include one or more different types of memory which may be used for performing device functions. For example, memory FIG. 512 may include cache, ROM, and/or RAM. Communications bus FIG. 522 may provide a data transfer path for transferring data to, from, or between at least storage device FIG. 514, memory FIG. 512, and processor FIG. 516. Although referred to as a bus, communications bus FIG. 522 is not limited to any specific data transfer technology. User interface FIG. 518 may allow a user to interact with the electronic device FIG. 500. For example, the user interface FIG. 518 can take a variety of forms, such as a button, keypad, dial, a click wheel, or a touch screen.

In one embodiment, the electronic device FIG. 500 may be an electronic device capable of processing and displaying media, such as image and video files. For example, the electronic device FIG. 500 may be a device such as such a mobile phone, personal data assistant (PDA), portable music player, monitor, television, laptop, desktop, and tablet computer, or other suitable personal device.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
 accessing a first manifest object incorporated in a media bundle file stored on a computer system, the first manifest object comprising information describing a first multimedia content object contained in the media bundle;
 generating a runtime structure for the first multimedia content object on the computer system based, at least in part, on information describing the first multimedia content object in the first manifest object;
 accessing a second manifest object incorporated in a media bundle overlay file stored on the computer system, the second manifest object comprising information describing a second multimedia content object contained in the media bundle overlay;
 incorporating the second multimedia content object described in the second manifest object into the runtime structure; and
 playing, on the computer system, a combination of the first and second multimedia content objects in accordance with the runtime structure.

2. The method of claim 1, wherein the first multimedia content object comprises a video content object.

3. The method of claim 2, wherein the second multimedia content comprises a non-video content object.

4. The method of claim 3, wherein the non-video content object comprises a subtitle content object.

5. The method of claim 1, wherein the first manifest object is a hierarchically structured object.

6. The method of claim 5, wherein the hierarchically structured object comprises an eXtended Markup Language (XML) object.

7. The method of claim 1, wherein incorporating the second multimedia content object into the runtime structure comprises replacing the first multimedia content object in the runtime structure with the second multimedia content object.

8. The method of claim 1, further comprising:
accessing a third manifest object contained in the second multimedia content object and;
incorporating a third multimedia content object contained in the second multimedia content object into the runtime structure based, at least in part, on information describing the third multimedia content object in the third manifest object.

9. The method of claim 1, further comprising:
defining a configuration for the computer system responsive to instructions received via a user interface,
wherein incorporating the second multimedia content object into the runtime structure comprises ignoring the second multimedia content object, responsive to the configuration of the computer system.

10. The method of claim 1, wherein playing, on the computer system, a combination of the first and second multimedia content objects in accordance with the runtime structure comprises:
streaming a third multimedia content identified by the second multimedia content object.

11. A non-transitory program storage device, readable by a programmable control device, comprising instructions stored thereon for causing the programmable control device to:
access a media bundle file stored on the programmable control device;
generate a runtime structure for the programmable control device responsive to a first manifest object contained in the media bundle file, the first manifest object describing a first multimedia content object contained in the media bundle file;
access a first media bundle overlay file stored on the programmable control device;
update the runtime structure for the programmable control device responsive to information contained in the first media bundle overlay file, comprising instructions for causing the programmable control device to:
incorporate a second multimedia content object contained in the first media bundle overlay file into the runtime structure; and
play, on the programmable control device, a combination of the first multimedia content object and the second multimedia content object.

12. The non-transitory program storage device of claim 11, further comprising instructions stored thereon for causing the programmable control device to:
update the runtime structure for the programmable device responsive to information contained in the first media bundle overlay file in a sandbox.

13. The non-transitory program storage device of claim 12, wherein the instructions to update the runtime structure for the programmable device responsive to information contained in the first media bundle overlay file in a sandbox are executed responsive to a determination the media bundle overlay file is untrusted.

14. The non-transitory program storage device of claim 11, further comprising instructions stored thereon for causing the programmable control device to:
stream multimedia content from an external content source identified by the second multimedia content object.

15. The non-transitory program storage device of claim 11, wherein the instructions for causing the programmable control device to incorporate the second multimedia content object into the runtime structure comprise instructions for causing the programmable control device to replace the first multimedia content object with the second multimedia content object.

16. A non-transitory storage device, readable by a programmable control device,
comprising files stored thereon for use by the programmable control device, the files comprising: a media bundle overlay file, comprising; a manifest object; and a multimedia content object,
wherein the media bundle overlay file corresponds to a media bundle accessible by the programmable control device, the media bundle comprising a media bundle manifest object that describes a media bundle multimedia content object, and
wherein the manifest object comprises information describing the multimedia content object for incorporating the multimedia content object into a runtime structure created by the programmable control device from the media bundler,
wherein the media bundle comprises: a code module for execution by the programmable control device, the code module containing instructions for causing the programmable control device to play the multimedia content object.

17. The non-transitory storage device of claim 16, wherein the manifest object of the media bundle overlay file is a hierarchically structured object.

18. The non-transitory storage device of claim 16, wherein the multimedia content object comprises a uniform resource locator that identifies a source of a multimedia content.

19. The non-transitory storage device of claim 16, wherein the media bundle file corresponds to a first human language and the media bundle overlay file corresponds to a second human language.

20. An apparatus, comprising:
a programmable control device;
a storage device, coupled to the programmable control device, wherein are stored
a media bundle file; and
a first media bundle overlay file; and
a memory coupled to the programmable control device, wherein instructions are stored in the memory, the instructions causing the programmable control device to:
access a first manifest object incorporated in the media bundle, the first manifest object comprising information describing a first multimedia content object contained in the media bundle;
generate a runtime structure for the first multimedia content object on the programmable control device based, at least in part, on information describing the first multimedia content object in the first manifest object;
access a second manifest object incorporated in the first media bundle overlay file, the second manifest object comprising information describing a second multimedia content object contained in the first media bundle overlay;
incorporate the second multimedia content object described in the second manifest object into the runtime structure; and
play, on the programmable device, a combination of the first and second multimedia content object in accordance with the runtime structure.

21. The apparatus of claim 20, wherein the first manifest object and the second manifest object are hierarchically structured objects.

22. The apparatus of claim 20, wherein the second multimedia content object comprises a reference to an external multimedia content available from an external source, and
where the instructions causing the programmable control device to play the combination of the first and second multimedia content objects comprises instructions to stream the external multimedia content from the external source.

23. The apparatus of claim 20, wherein the instructions causing the programmable control device to incorporate the second multimedia content object described in the second manifest object into the runtime structure comprise instructions causing the programmable control device to:
replace the first multimedia content object with the second multimedia content object in the runtime structure.

24. The apparatus of claim 20, further comprising:
a second media bundle overlay file, stored on the storage device, comprising:
a third manifest object; and
a third multimedia content object, described by the third manifest object,
wherein the instructions stored in the memory further comprise instructions causing the programmable control device to:
select one of the first media bundle overlay file and the second media bundle overlay file, responsive to a configuration of the programmable control device;
access one of the second manifest object and the third manifest object corresponding to the selected media bundle overlay file;
update the runtime structure with one of the second multimedia content object and the third multimedia content object, corresponding to the selected media bundle overlay file; and
play, on the programmable device, a combination of the first multimedia content object and one of the second multimedia content object and the third multimedia content object, in accordance with the runtime structure.

25. The apparatus of claim 20, wherein the first media bundle overlay file further comprises instructions to be loaded into memory comprising instructions causing the programmable control device to play the second multimedia content object.

* * * * *

UNITED STATES PATENT AND TRADEMARK OFFICE
CERTIFICATE OF CORRECTION

| | | |
|---|---|---|
| PATENT NO. | : 9,047,913 B2 | Page 1 of 1 |
| APPLICATION NO. | : 13/368120 | |
| DATED | : June 2, 2015 | |
| INVENTOR(S) | : Samir Gehani | |

It is certified that error appears in the above-identified patent and that said Letters Patent is hereby corrected as shown below:

Claims

In Claim 16, Column 12, Line 23, please change:

"the media bundler," to --the media bundle,--.

Signed and Sealed this
Twenty-third Day of February, 2016

Michelle K. Lee
*Director of the United States Patent and Trademark Office*